(12) United States Patent
Eastman et al.

(10) Patent No.: US 12,407,002 B2
(45) Date of Patent: Sep. 2, 2025

(54) SEPARATOR LAYER FOR FLOW BATTERY

(71) Applicant: Raytheon Technologies Corporation, Farmington, CT (US)

(72) Inventors: Scott Alan Eastman, Glastonbury, CT (US); Wei Xie, East Hartford, CT (US); Michael L. Perry, Glastonbury, CT (US)

(73) Assignee: RTX CORPORATION, Arlington, VA (US)

( * ) Notice: Subject to any disclaimer, the term of this patent is extended or adjusted under 35 U.S.C. 154(b) by 0 days.

(21) Appl. No.: 17/942,474

(22) Filed: Sep. 12, 2022

(65) Prior Publication Data

US 2023/0016898 A1 Jan. 19, 2023

Related U.S. Application Data

(63) Continuation of application No. 15/079,239, filed on Mar. 24, 2016, now abandoned.

(51) Int. Cl.
*H01M 8/0221* (2016.01)
*H01M 4/86* (2006.01)
(Continued)

(52) U.S. Cl.
CPC ....... *H01M 8/0221* (2013.01); *H01M 4/8605* (2013.01); *H01M 4/96* (2013.01); *H01M 8/0213* (2013.01); *H01M 8/1025* (2013.01); *H01M 8/1027* (2013.01); *H01M 8/103* (2013.01); *H01M 8/1032* (2013.01); *H01M 8/188* (2013.01); *H01M 8/20* (2013.01); *H01M 50/411* (2021.01); *H01M 50/414* (2021.01); *H01M 50/423* (2021.01); *H01M 50/489* (2021.01);
(Continued)

(58) Field of Classification Search
CPC .. H01M 8/0221; H01M 8/0213; H01M 8/188; H01M 8/20; H01M 4/8605; H01M 4/96; H01M 2250/10
See application file for complete search history.

(56) References Cited

U.S. PATENT DOCUMENTS

| 5,318,865 A | 6/1994 | Kaneko et al. |
| 5,648,184 A | 7/1997 | Inoue et al. |

(Continued)

FOREIGN PATENT DOCUMENTS

| CN | 103210017 | 7/2013 |
| CN | 105190971 | 12/2015 |

(Continued)

OTHER PUBLICATIONS

File History for U.S. Appl. No. 13/513,651 now U.S. Pat. No. 9,166,243 issued Oct. 20, 2015.
(Continued)

*Primary Examiner* — James M Erwin
(74) *Attorney, Agent, or Firm* — Carlson, Gaskey & Olds, P.C.

(57) ABSTRACT

A flow battery includes an electrochemical cell that has a first electrode, a second electrode spaced apart from the first electrode, and a separator layer arranged between the first electrode and the second electrode. The separator layer is formed of a polymer that has a polymer backbone with cyclic groups that are free of unsaturated nitrogen and one or more polar groups bonded between the cyclic groups.

11 Claims, 1 Drawing Sheet

(51) Int. Cl.

| | | |
|---|---|---|
| H01M 4/96 | (2006.01) | |
| H01M 8/0213 | (2016.01) | |
| H01M 8/1025 | (2016.01) | |
| H01M 8/1027 | (2016.01) | |
| H01M 8/103 | (2016.01) | |
| H01M 8/1032 | (2016.01) | |
| H01M 8/18 | (2006.01) | |
| H01M 8/20 | (2006.01) | |
| H01M 50/411 | (2021.01) | |
| H01M 50/414 | (2021.01) | |
| H01M 50/423 | (2021.01) | |
| H01M 50/489 | (2021.01) | |

(52) U.S. Cl.
CPC .......... *H01M 2250/10* (2013.01); *Y02B 90/10* (2013.01); *Y02E 60/50* (2013.01)

(56) References Cited

U.S. PATENT DOCUMENTS

| | | | |
|---|---|---|---|
| 9,166,243 B2 | 10/2015 | Perry | |
| 9,276,282 B2 | 3/2016 | Zhang et al. | |
| 2001/0028977 A1 | 10/2001 | Kazacos et al. | |
| 2006/0003210 A1 | 1/2006 | Ofer et al. | |
| 2008/0274393 A1 | 11/2008 | Markoski et al. | |
| 2008/0292938 A1 | 11/2008 | Perry et al. | |
| 2009/0136789 A1 | 5/2009 | Pien et al. | |
| 2012/0202099 A1 | 8/2012 | Perry et al. | |
| 2013/0115504 A1* | 5/2013 | Lee ..................... | H01M 8/1044 429/247 |
| 2013/0157155 A1 | 6/2013 | Park et al. | |
| 2013/0217851 A1 | 8/2013 | Fedurco et al. | |
| 2013/0316268 A1 | 11/2013 | Lee et al. | |
| 2014/0030631 A1 | 1/2014 | Esswein | |
| 2015/0349342 A1* | 12/2015 | Creeth ................ | C01G 39/006 429/105 |
| 2016/0128579 A1 | 5/2016 | Kandori | |

FOREIGN PATENT DOCUMENTS

| | | | |
|---|---|---|---|
| JP | 854-19228 | 7/1979 | |
| JP | H02-148659 | 6/1990 | |
| JP | 2006-156029 | 6/2006 | |
| JP | 2014098137 | 5/2014 | |
| WO | 2014088601 | 6/2014 | |
| WO | 2015119272 | 8/2015 | |
| WO | WO-2015119272 A1 * | 8/2015 | ............. C08G 73/18 |

OTHER PUBLICATIONS

Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricó, A.S., Cretí, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-976.
Kazim, A., Liu, H.T., and Forges, P. (1999). Modelling of performance of PEM fuel cells with conventional and nterdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated low fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Appl. No. 9,166,243. Executed Feb. 23, 2017. pp. 1-89.
Prior Art Claim Chart for U.S. Pat. No. 9,166,243.
Ponce de León, C., Frías-Ferrer, A., González-García, Sźanto, D.A., and Walsh, F.C. (2006). Redox low cells for energy conversion. Journal of Power Sources vol. 160. 2006. pp. 716-32.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.
European Search Report for European U.S. Appl. No. 17/161,778 completed May 24, 2017.
Wei, X. et.al. (2013). Polyvinyl chloride/silica nanoporous composite separator for all-vanadium redox flow battery Applications. Journal of The Electrochemical Society 160(8) pp. A1215-A1218.
Zhou, X.L. et.al. (2015). The use of polybenzimidazole membranes in vanadium redox flow batteries leading to increased coulombic efficiency and cycling performance. Electrochimica Acta. 153 pp. 492-498.
Darling, R. et al. (2016). Transport property requirements for flow battery separators. Journal of The Electrochemical Society 163(1) pp. A5029-A5040.
Tang, L., Leung, P., Xu, Q., Mohamed, M.R., Dai, S., Zhu, X., Flox, C., & Shah, A.A. (2022). Future perspective on redox flow batteries: aqueous versus nonaqueous electrolytes. Current Opinion in Chemical Engineering. vol. 37. 2002. pp. 1-8.

\* cited by examiner

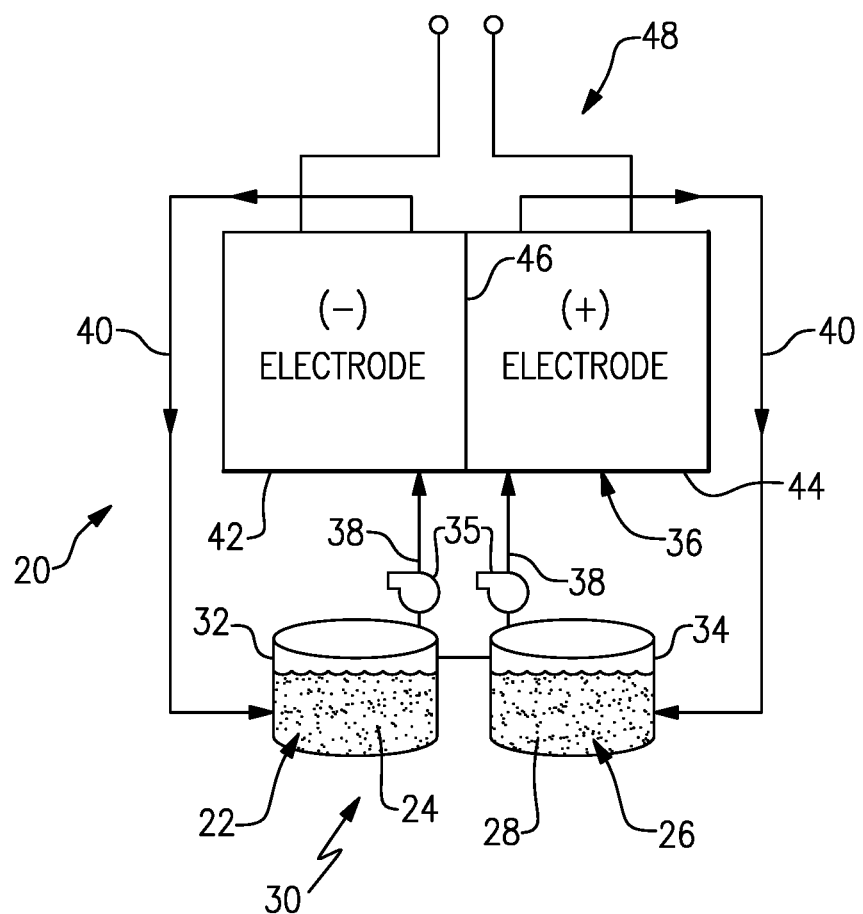

SEPARATOR LAYER FOR FLOW BATTERY

CROSS-REFERENCE TO RELATED APPLICATIONS

This application is a continuation of U.S. patent application Ser. No. 15/079,239 filed Mar. 24, 2016, the disclosure of which is incorporated by reference in its entirety herein.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

A flow battery according to an example of the present disclosure includes an electrochemical cell that has a first electrode, a second electrode spaced apart from the first electrode, and a separator layer arranged between the first electrode and the second electrode. The separator layer is formed of a polymer having a polymer backbone with aromatic groups that are free of unsaturated nitrogen and one or more polar groups bonded in the polymer backbone.

In a further embodiment of any of the foregoing embodiments, the one or more polar groups includes an atom selected from the group consisting of sulfur, oxygen, nitrogen, and combinations thereof.

In a further embodiment of any of the foregoing embodiments, the aromatic groups include nitrogen heterocycles.

In a further embodiment of any of the foregoing embodiments, the polymer backbone is free of unsaturated nitrogen.

In a further embodiment of any of the foregoing embodiments, the polymer includes at least one of adsorbed acid groups or aqueous electrolyte that is non-covalently bonded to the one or more polar groups.

In a further embodiment of any of the foregoing embodiments, the polymer includes polyetherimide (PEI).

In a further embodiment of any of the foregoing embodiments, the polymer includes polyamide-imide (PAI).

In a further embodiment of any of the foregoing embodiments, the polymer includes polyetheretherketone (PEEK).

In a further embodiment of any of the foregoing embodiments, the polymer includes polysulfone (PSF).

In a further embodiment of any of the foregoing embodiments, the polymer includes polyphenylene sulfide (PPS).

In a further embodiment of any of the foregoing embodiments, the polymer is selected from the group consisting of polyetherimide (PEI), polyamide-imide (PAI), polyetheretherketone (PEEK), polysulfone (PSF), polyphenylene sulfide (PPS), and combinations thereof.

A further embodiment of any of the foregoing embodiments includes a supply/storage system external of the electrochemical cell. The supply/storage system includes first and second vessels, first and second liquid electrolytes in, respectively, the first and second vessels, fluid lines connecting the first and second vessels to, respectively, the first electrode and the second electrode, and a plurality of pumps operable to circulate the first and second liquid electrolytes via the fluid lines between the first and second vessels and the electrochemical cell.

In a further embodiment of any of the foregoing embodiments, the separator layer has an area specific resistance of less than approximately 425 mΩ*cm2.

A separator layer for use in a flow battery, the separator layer being formed of a polymer having a polymer backbone with aromatic groups that are free of unsaturated nitrogen, wherein the separator layer has an area specific resistance of less than approximately 425 mΩ*cm2.

In a further embodiment of any of the foregoing embodiments, the separator layer has an area specific resistance of less than approximately 300 mΩ*cm2.

In a further embodiment of any of the foregoing embodiments, the polymer is selected from the group consisting of polyetherimide (PEI), polyamide-imide (PAI), polyetheretherketone (PEEK), polysulfone (PSF), polyphenylene sulfide (PPS), polystyrene (PS) and combinations thereof.

A flow battery according to an example of the present disclosure includes an electrochemical cell that has a first electrode, a second electrode spaced apart from the first electrode, and a separator layer arranged between the first electrode and the second electrode. The first electrode and the second electrode are configured to operate at a current density of greater than or equal to approximately 100 mA/cm2 and a supply/storage system external of the electrochemical cell. The supply/storage system includes first and second vessels, first and second liquid electrolytes in, respectively, the first and second vessels, fluid lines connecting the first and second vessels to, respectively, the first electrode and the second electrode, and a plurality of pumps operable to circulate the first and second liquid electrolytes via the fluid lines between the first and second vessels and the electrochemical cell. The separator layer is formed of a polymer having a polymer backbone with aromatic groups that are free of unsaturated nitrogen and one or more polar groups bonded in the polymer backbone.

A flow battery according to an example of the present disclosure includes an electrochemical cell that has a first electrode, a second electrode spaced apart from the first electrode, and a separator layer arranged between the first electrode and the second electrode. The separator layer is formed of a polymer having a polymer backbone with triazine groups.

In a further embodiment of any of the foregoing embodiments, the polymer backbone includes one or more polar groups bonded in the polymer backbone In a further embodiment of any of the foregoing embodiments, the one or more polar groups includes an atom selected from the group consisting of sulfur, oxygen, nitrogen, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example flow battery.

DETAILED DESCRIPTION

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 that has an electrochemically active species 24 that functions in a redox pair with regard to an additional fluid electrolyte 26 that has an electrochemically active species 28. The electrochemically active species 24/28 include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24/28 could also be organic molecules that contain groups that undergo electrochemically reversible reactions, such as quinones.

The first fluid electrolyte 22 (e.g., the negative electrolyte) and the second fluid electrolyte 26 (e.g., the positive electrolyte) are contained in a supply/storage system 30 that includes first and second vessels 32/34 and pumps 35. The fluid electrolytes 22/26 are delivered using the pumps 35 to at least one electrochemical cell 36 of the flow battery 20 through respective feed lines 38 and are returned from the cell 36 to the vessels 32/34 via return lines 40. The feed lines 38 and the return lines 40 connect the vessels 32/34 with first and second electrodes 42/44. Multiple cells 36 can be provided as a stack.

The cell 36 includes the first electrode 42, the second electrode 44 spaced apart from the first electrode 42, and a separator layer 46 arranged between the first electrode 42 and the second electrode 44. For example, the electrodes 42/44 are porous carbon structures, such as carbon paper or felt. The electrodes 42/44 may each be configured for operation at relatively high current densities, such as but not limited to, current density greater than or equal to approximately 100 mA/cm$^2$.

In general, the cell or cells 36 can include bipolar plates, manifolds and the like for delivering the fluid electrolytes 22/26 through flow field channels to the electrodes 42/44. The bipolar plates can be carbon plates, for example. It is to be understood however, that other configurations can be used. For example, the cell or cells 36 can alternatively be configured for flow-through operation where the fluid electrolytes 22/26 are pumped directly into the electrodes 42/44 without the use of flow field channels.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

The separator layer 46 prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states.

In particular, due to the highly oxidative and acidic environment in flow batteries in comparison to gaseous fuel cells, there are only a few materials (e.g., perfluorosulfonic acid) that are useful as a separator layer or ion exchange membrane. Materials that may be effective in the less severe environment of a gaseous fuel cell are degraded by the oxidative and acidic environment in flow batteries and suffer from inadequate ion conductivity (e.g., proton conductivity) and/or ion selectivity (e.g., blocking permeation of vanadium or other electrochemically active ion species that can reduce energy efficiency). In this regard, as discussed further below, the disclosed separator layer 46 is formed of a polymer that may be stable in the oxidative and acidic environment in the flow battery 20 and that may have good ion conductivity and ion selectivity, among other properties.

In addition to ion conductivity and ion selectivity, the separator layer 46 has properties such as ionic resistance, area specific resistance, and electric conductivity and resistivity. The ionic resistance is measured, in ohms ($\Omega$), between the opposed surfaces of the separator layer 46. The ionic resistance is a function of the thickness of the separator layer 46, the cross-sectional area, and the bulk resistivity. The (ionic) area specific resistance is a function of the ionic resistance and cross-sectional area. The area specific resistance can be calculated, in units of amperes per area squared, by the equation $R_{AS}=R*A$, where $R_{AS}$ is the area specific resistance, R is ionic resistance, and A is cross-sectional area.

As an example, the separator layer 46 is formed of a polymer that has a polymer backbone with aromatic groups that are free of (i.e., exclude) unsaturated nitrogen and that has one or more polar groups that are bonded within the polymer backbone. Such polar groups may be located between the cyclic groups, but are not limited to such locations. The aromatic groups may provide the separator layer 46 with good chemical stability in the oxidative and acidic environment of the flow battery 20, while the polar groups may provide permanent dipoles that are non-covalently bonded to adsorbed acid groups and/or aqueous electrolyte that serve to facilitate ion conductivity. As examples, the one or more polar groups can include, but are not limited to, groups that have one or more high electronegative atoms selected from sulfur, oxygen, nitrogen, and combinations thereof. In further examples, the polar groups include one or more of the chemical structures: C—O—C, C=O, N—C=O, S=O, S=O=S, or C—S.

In further examples, the aromatic groups of the polymer backbone include six-carbon atom rings and/or aromatic groups with nitrogen heterocycles. Since the aromatic groups are free of unsaturated nitrogen, the nitrogen heterocycles are also free of unsaturated nitrogen. Although not limited, such nitrogen heterocycles may include a five-atom ring that has one nitrogen atom and four carbon atoms. As will be appreciated, other aromatic groups and aromatic groups with nitrogen heterocycles according to Hückel's rule may additionally or alternatively be used.

Furthermore, the flow battery 20 generally operates at much lower temperatures (e.g., less than 100° C., but typically less 50° C.) than some types of fuel cells (e.g., greater than 200° C.). Thus, the selected polymer need not have the high temperature stability that is required in fuel cell membranes. For instance, the glass transition temperature of the selected polymer need only be greater than the expected operating temperature of the flow battery 20 (greater than 50° C. or 100° C.).

In further examples, the polymer of the separator layer 46 is selected from polyetherimide (PEI), polyamide-imide (PAI), polyetheretherketone (PEEK), polysulfone (PSF), polyphenylene sulfide (PPS), or combinations thereof. It is to be understood that the example polymers herein include the molecular formula of the polymer and any isomers based upon the formula. Additionally, a combination could be in the form of blends, alloys, and co-, ter-, quatrenary- (etc.) polymers, where at least a portion of the component is of the polymers listed subsequently. Shown below are example structures of the polymer of the separator layer 46, with adsorbed acid groups or aqueous electrolyte, represented at "A," that are non-covalently bonded to the one or more of the polar groups:

Polyetherimide:

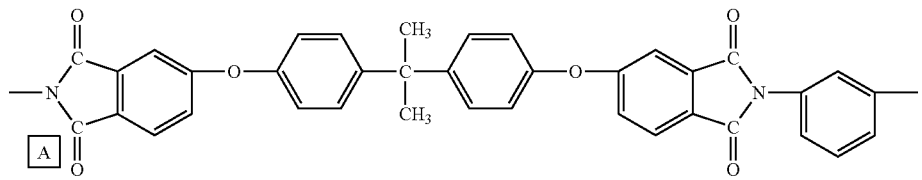

Polyamide-imide:

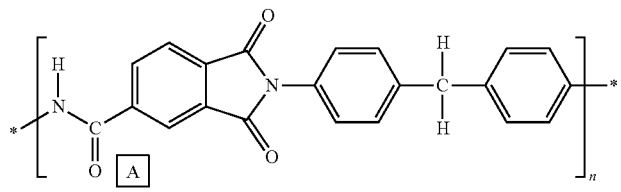

Polyetheretherketone:

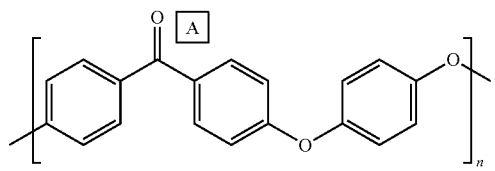

Polysulfone:

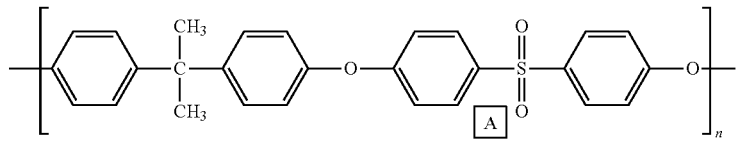

Polyphenylene sulfide:

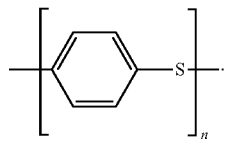

In another example, the separator layer 46 is formed of a polymer that has a polymer backbone with triazine groups. A triazine group is a nitrogen heterocycle that includes three nitrogen atoms in an aromatic ring. In further examples, the polymer backbone may also include one or more polar groups as discussed herein above that are bonded within the polymer backbone. The triazine groups may provide the separator layer 46 with good chemical stability in the oxidative and acidic environment of the flow battery 20, while the polar groups may provide permanent dipoles that are non-covalently bonded to adsorbed acid groups and/or aqueous electrolyte that serve to facilitate ion conductivity.

In further examples, the separator layer 46 has a thickness of less than approximately 125 micrometers or less than 100 micrometers, based on the flow battery 20 operating at an average current density above approximately 100 mA/cm²

(e.g., greater than 200 mA/cm$^2$). In a further example, the area specific resistance is less than approximately 425 mΩ*cm$^2$, based on the flow battery 20 operating at an average current density above approximately 100 mA/cm$^2$ (e.g., greater than 200 mA/cm$^2$). In further examples, the separator layer 46 has an area specific resistance of less than approximately 425 mΩ*cm$^2$ and the polymer of the separator layer 46 is selected from polyetherimide (PEI), polyamide-imide (PAI), polyetheretherketone (PEEK), polysulfone (PSF), polyphenylene sulfide (PPS), polystyrene, or combinations thereof.

In a further example, the area specific resistance of the separator layer 46 is less than approximately 300 mΩ*cm$^2$, based on the flow battery 20 operating at an average current density above approximately 100 mA/cm$^2$ (e.g., greater than 200 mA/cm$^2$) and the use of aqueous electrolytes 22/26. In a further example, the ion conductivity of the separator layer 46 is greater than or equal to 0.05 S/cm.

In an additional example, the separator layer 46 has an electronic area specific resistance of greater than approximately 1×10$^4$Ω*cm$^2$. Electronic area specific resistance is similar to ionic area specific resistance but utilizes electric resistance rather than ionic resistance in the calculation. In a further example, the separator layer 46 has a per-cycle selectivity of greater than 99.995% based on use of dissimilar electrolytes 22/26. Per-cycle selectivity is defined as the number of moles of desired ion passed over a full charge/discharge cycle divided by the sum of the number of moles of desired ion passed and the number of moles of reactant or other species that can lead to degradation or a loss of current efficiency per charge/discharge cycle.

The separator layer 46 can be fabricated using a technique that is capable of producing a relatively uniform, thin layer of the polymer. Example techniques may include, but are not limited to, solution casting, blade coating, spin coating, dip molding, melt pressing, extruding, and sol-gel processing.

In additional examples, the fabrication technique is adapted to adjust a balance between ion conductivity and selectivity. For example, where the polymer in an as-fabricated state has low ion conductivity and high selectivity, the technique may be adapted to sacrifice a portion of the selectivity in order to obtain better conductivity. In this regard, the separator layer 46 can be fabricated with a controlled porosity. The porosity permits greater uptake of acid groups (e.g., acid electrolyte), which may non-covalently bond at the permanent dipoles of the polar groups of the polymer to increase ion conductivity. While such porosity enhances conductivity, it may also decrease selectivity by providing greater free volume through which electrochemically active ions can migrate.

One example of an adapted fabrication technique includes inclusion of a sacrificial additive, such as powder and/or liquid additives, in a solution casting material. The sacrificial additive is mixed into and dispersed through the solution casting material. Upon casting and drying/curing, the additive remains in the separator layer 46. However, the additive is active with regard to the liquid electrolyte used in the flow battery 20 such that the additive either dissolves or reacts once exposed to the liquid electrolyte. The reaction or dissolution serves to remove the additive from the separator layer 46, thereby leaving a controlled porosity in the separator layer 46 for uptake of acid groups from the electrolyte. As examples, the additive may include, but is not limited to, oxalic acid, polyethylene glycol, or combinations thereof. The separator layer 46 may this be fabricated in a "dry" state without any adsorbed liquid electrolyte and subsequently installed into the flow battery 20 in the dry state, which facilitates greater toleration of stresses from handling and compression during installation.

The reaction or dissolution of the powder may consume protons from the liquid electrolyte; however, the effect on the liquid electrolyte will be low and can be accounted for in initially formulating the liquid electrolyte to have a higher concentration of the active species that are affected.

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURES or all of the portions schematically shown in the FIGURES. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A flow battery comprising:
   an electrochemical cell including a first electrode, a second electrode spaced apart from the first electrode, and a separator layer arranged between the first electrode and the second electrode, each of the first electrode and the second electrode configured to operate at a current density of greater than or equal to approximately 100 mA/cm$^2$; and
   a supply/storage system external of the electrochemical cell, the supply/storage system including first and second vessels, first and second liquid electrolytes in, respectively, the first and second vessels, fluid lines connecting the first and second vessels to, respectively, the first electrode and the second electrode, and a plurality of pumps operable to circulate the first and second liquid electrolytes via the fluid lines between the first and second vessels and the electrochemical cell, each of the first and second liquid electrolytes comprising an aqueous acid supporting electrolyte,
   wherein the separator layer is formed of a polymer having a polymer backbone with triazine aromatic groups and one or more polar groups bonded in the polymer backbone.

2. The flow battery as recited in claim 1, wherein the one or more polar groups includes an atom selected from the group consisting of sulfur, oxygen, nitrogen, and combinations thereof.

3. The flow battery as recited in claim 1, wherein the polymer includes at least one of adsorbed acid groups or aqueous electrolyte that is non-covalently bonded to the one or more polar groups.

4. The flow battery as recited in claim 1, wherein the separator layer has an area specific resistance of less than approximately 425 mΩ*cm$^2$.

5. The flow battery as recited in claim 1, wherein the separator is less than approximately 125 micrometers thick.

6. The flow battery as recited in claim 1, wherein the flow battery operates at an average current density greater than 200 mA/cm$^2$.

7. The flow battery as recited in claim 1, wherein an ion conductivity of the separator layer is greater than or equal to 0.05 S/cm.

8. The flow battery as recited in claim 1, wherein the separator layer has an electronic area specific resistance of greater than approximately $1 \times 10^4 \Omega \cdot cm^2$.

9. The flow battery as recited in claim 1, wherein the separator layer has an area specific resistance of less than approximately 300 $m\Omega \cdot cm^2$, a thickness of less than approximately 100 micrometers, an ion conductivity of greater than or equal to 0.05 S/cm, and wherein the flow battery operates at an average current density greater than 200 $mA/cm^2$.

10. The flow battery as recited in claim 1, wherein the first and second liquid electrolytes include electrochemically active vanadium ion species in solution with the aqueous acid supporting electrolyte.

11. The flow battery as recited in claim 1, wherein the first and second liquid electrolytes include 1-5M sulfuric acid.

* * * * *